(12) United States Patent
Bacher

(10) Patent No.: US 9,682,713 B2
(45) Date of Patent: Jun. 20, 2017

(54) CABLE RETURN PULLEY AND CABLE TRANSPORTATION SYSTEM COMPRISING SUCH A PULLEY

(71) Applicant: ROPFIN B.V., Leimuiden (NL)

(72) Inventor: Christian Bacher, Gossensass (IT)

(73) Assignee: ROPFIN B.V., Leimuiden (NL)

( * ) Notice: Subject to any disclaimer, the term of this patent is extended or adjusted under 35 U.S.C. 154(b) by 452 days.

(21) Appl. No.: 14/398,062

(22) PCT Filed: May 3, 2013

(86) PCT No.: PCT/IB2013/053540
§ 371 (c)(1),
(2) Date: Oct. 30, 2014

(87) PCT Pub. No.: WO2013/164799
PCT Pub. Date: Nov. 7, 2013

(65) Prior Publication Data
US 2015/0114251 A1    Apr. 30, 2015

(30) Foreign Application Priority Data

May 4, 2012   (IT) .............................. MI2012A0753

(51) Int. Cl.
*B61B 12/00* (2006.01)
*B61B 12/02* (2006.01)
(Continued)

(52) U.S. Cl.
CPC ............ *B61B 12/026* (2013.01); *B61B 12/02* (2013.01); *B61B 12/10* (2013.01); *F16H 55/46* (2013.01); *F16H 55/12* (2013.01)

(58) Field of Classification Search
CPC ....... B61B 12/026; B61B 12/02; B61B 12/10; F16H 55/46; F16H 55/12
See application file for complete search history.

(56) References Cited

U.S. PATENT DOCUMENTS 1,694,274 A * 12/1928 McKean ................... F16H 7/24
474/130
2,954,061 A *  9/1960 Stordal ................ B23D 55/065
474/191
(Continued)

FOREIGN PATENT DOCUMENTS

EP      1099880       5/2001
EP      1584845      10/2005
(Continued)

OTHER PUBLICATIONS

International Search Report and Written Opinion for International Application No. PCT/IB2013/053540 dated Aug. 2, 2013.
(Continued)

*Primary Examiner* — Jason C Smith
(74) *Attorney, Agent, or Firm* — Neal, Gerber & Eisenberg LLP

(57) ABSTRACT

A cable transportation system cable return pulley has a hub, which is configured to rotate about an axis of rotation and has a plurality of lateral coupling sides lying along respective coplanar straight lines crosswise to the axis of rotation; and a main body, which is coupled to the hub, has an annular seat configured to house the cable, and a quantity of sectors equal to the quantity of lateral coupling sides of the hub, and wherein each sector is coupled to the hub and to the adjacent sectors solely along two of the straight lines.

18 Claims, 4 Drawing Sheets

(51) Int. Cl.
*F16H 55/46* (2006.01)
*B61B 12/10* (2006.01)
*F16H 55/12* (2006.01)

(56) References Cited

U.S. PATENT DOCUMENTS

| | | | | |
|---|---|---|---|---|
| 5,316,522 A * | 5/1994 | Carbone | ............. | F16H 55/12 |
| | | | | 474/164 |
| 6,881,166 B1 * | 4/2005 | Burkhardt | ............. | F16H 55/50 |
| | | | | 474/166 |
| 7,069,805 B2 * | 7/2006 | Ishizuka | ............. | F16H 55/17 |
| | | | | 74/457 |
| 8,496,552 B2 * | 7/2013 | Kvasnicka | ............. | F02B 67/06 |
| | | | | 474/148 |
| 9,085,846 B2 * | 7/2015 | Garlatti | ............. | D06F 37/30 |
| 2005/0192146 A1 * | 9/2005 | Marten-Perolino | ..... | B61B 12/10 |
| | | | | 474/176 |
| 2014/0305241 A1 * | 10/2014 | Li | ............. | F16H 55/12 |
| | | | | 74/448 |
| 2015/0114251 A1 * | 4/2015 | Bacher | ............. | F16H 55/46 |
| | | | | 104/197 |
| 2015/0226310 A1 * | 8/2015 | Schubert | ............. | F16H 55/40 |
| | | | | 254/390 |

FOREIGN PATENT DOCUMENTS

| | | |
|---|---|---|
| EP | 1610035 | 12/2005 |
| FR | 2866935 | 9/2005 |
| GB | 191120186 | 9/1912 |

OTHER PUBLICATIONS

Notification Concerning Submission, Obtention or Transmittal of Priority Document (Form PCT/IB/304) for International Application No. PCT/IB2013/053540 dated Aug. 8, 2013.
Letter to International Bureau of WIPO for International Application No. PCT/IB2013/053540 dated Oct. 24, 2014.

* cited by examiner

CABLE RETURN PULLEY AND CABLE TRANSPORTATION SYSTEM COMPRISING SUCH A PULLEY

PRIORITY CLAIM

This application is a national stage application of PCT/IB2013/053540, filed on May 3, 2013, which claims the benefit of and priority to Italian Patent Application No. MI2012A 000753, filed on May 4, 2012, the entire contents of which are each incorporated by reference herein.

BACKGROUND

Certain known cable transportation systems comprise two turnaround stations, between which extends at least one haul cable. The turnaround stations each comprise a supporting structure; a pulley that rotates about an axis with respect to the supporting structure; and a drive member connected to the pulley by a transmission.

The turnaround station pulleys are of considerable size—roughly 4 to 6 meters in diameter—and therefore difficult to transport. So each pulley is normally divided into easy-to-transport sectors.

For example, European Patent document no. EP1584845 describes a pulley comprising a polygonal hub that rotates about an axis; and a plurality of sectors, each with three coupling faces. One coupling face is coupled to the hub, and the other two are coupled to the adjacent sectors and extend radially with respect to the hub rotation axis.

Solutions of this type, however, call for a high degree of precision in fabricating the sectors. Any machining errors may seriously compromise connection of the sectors to the hub and so make the pulley difficult to assemble. Very often, machining errors must be corrected on site, or even call for replacing the sector, with certain drawbacks in terms of cost.

SUMMARY

The present disclosure relates to a cable return pulley, and to a cable transportation system comprising such a pulley.

It is therefore an advantage of the present disclosure to provide a pulley that is relatively cheap and relatively easy to produce, and at the same time relatively easier to assemble.

According to certain embodiments of the present disclosure, there is provided a cable transportation system cable return pulley comprising:

a hub, which is configured to rotate about an axis of rotation and has a plurality of lateral coupling sides lying along respective coplanar straight lines crosswise to the axis of rotation; and a main body coupled to the hub and which comprises an annular seat configured to house the cable; and a quantity or number of sectors equal to the quantity or number of lateral coupling sides of the hub; and wherein each sector is coupled to the hub and to the adjacent sectors solely along two of said straight lines.

The pulley is thus relatively cheap and relatively easy to produce, by fabrication of the sectors not requiring the same high degree of machining precision as for certain known pulleys. Specifically, the solution disclosed herein requires only one dimensional check per sector, namely that the coupling edges of each sector extend along axes forming the same angle as that formed by the two straight lines along which the two respective lateral coupling sides lie. Such condition can be met relatively easily, relatively effectively and relatively cheaply using a template.

It should thus be appreciated that the coupling edges of each sector lie along only two of the straight lines provides that the same sized hub can be used for pulleys of different diameters, with certain economic advantages in terms of hub manufacture and storage. To produce pulleys of different diameters, larger sectors need simply be produced, with no alterations to the size or structure of the hub.

In certain embodiments of the cable return pulley, the straight lines are perpendicular.

The coupling edges of each sector are thus also perpendicular, making production and assembly relatively easier.

In certain embodiments of the cable return pulley, the main body comprises at least two substantially identical sectors.

The sectors are thus relatively easier to produce, due to the presence of sectors of substantially the same size.

In certain embodiments of the cable return pulley, all the sectors are substantially identical.

The sectors can thus be mass-produced. Moreover, sectors of the same size are relatively easier to transport and store than sectors of different sizes.

In another embodiment of the cable return pulley, the sectors are four in quantity or number.

Dividing the main body into four sectors provides for optimum, even distribution of the component parts.

In certain embodiments of the cable return pulley, the annular seat has a bottom wall lined with a layer of elastomer material.

In this way, any outwardly non-flush joints between adjacent sectors (shown by the letter S in FIG. 1) pose no problems, by being substantially cancelled out by an elastomer surface supporting the cable. This reduces production cost, as compared with that of certain known pulleys, by reducing the machining precision required for each sector. With this feature, in fact, machining errors in the order of millimeters can safely be tolerated.

In certain embodiments of the cable return pulley, each sector has a curved outer edge in which the annular seat is formed; and an inner edge, which extends substantially along the two straight lines; the inner edge having at least one recess.

The at least one recess along the inner edge of each sector reduces the structural weight of the sector and makes the sector relatively easier to handle and transport. It should thus be appreciated that the at least one recess reduces the amount of material needed to produce, and therefore the production cost of, each sector.

In certain embodiments of the cable return pulley, each sector has at least one hole.

Like the recess, the hole reduces the structural weight of each sector, making each sector relatively easier to produce and assemble.

Another advantage of the disclosure is to provide a cable transportation system that is relatively cheap and relatively easy to produce.

According to the present disclosure, there is provided a cable transportation system including:

two turnaround stations, at least one of the turnaround stations having a return pulley including:

a hub configured to rotate about an axis of rotation, said hub including a quantity of at least two lateral coupling sides lying along respective coplanar straight lines crosswise to the axis of rotation; and a main body coupled to the hub, said main body including:

an annular seat configured to house a cable, and
a quantity of sectors equal to the quantity of lateral coupling sides of the hub, wherein each sector is coupled to the hub and to two adjacent sectors solely along two of said straight lines; and at least one haul cable extending between the two turnaround stations.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
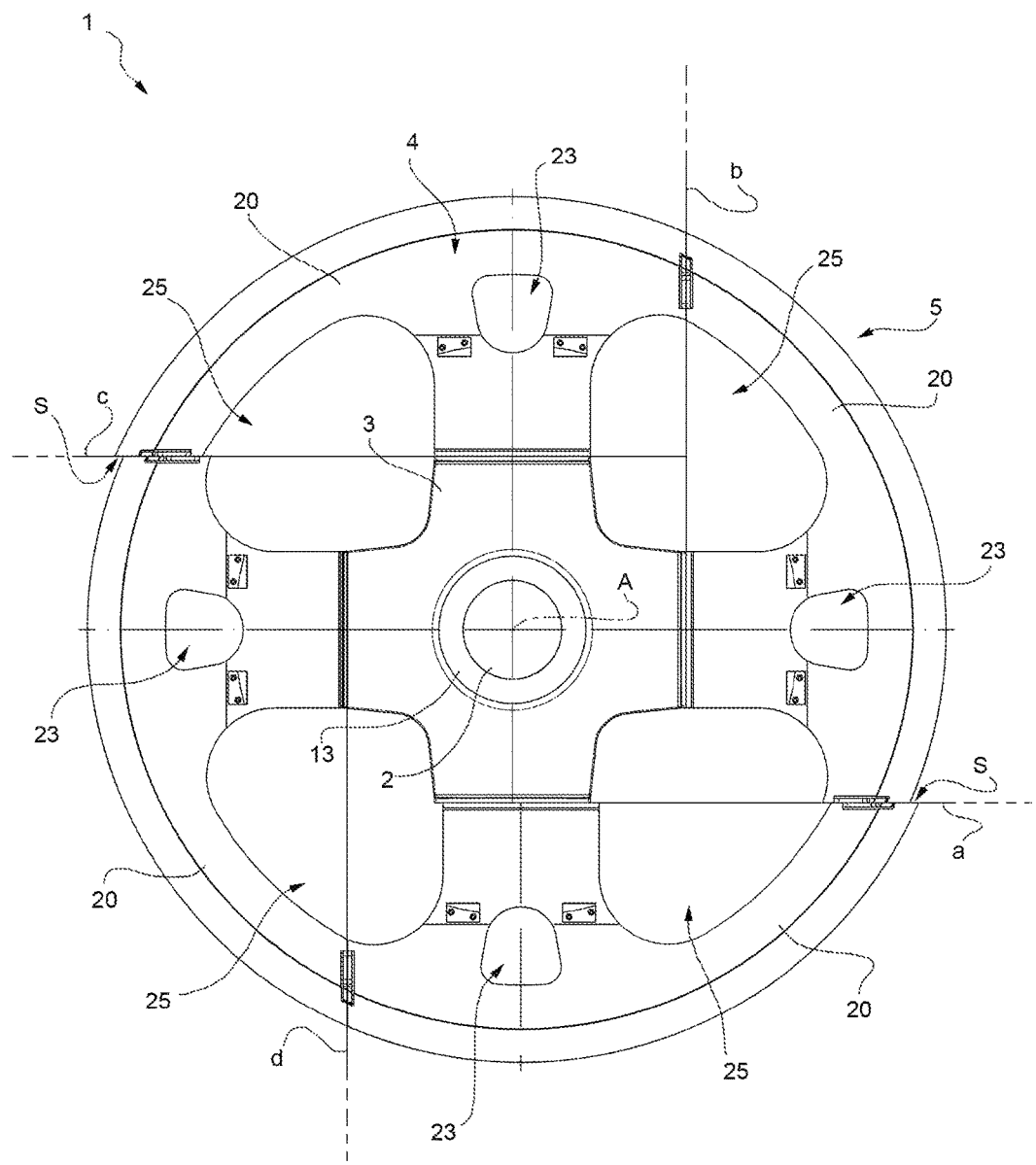
FIG. 1 shows a schematic underside view, with parts removed for clarity, of the cable return pulley according to the present disclosure.

Referring now to the example embodiments of the present disclosure illustrated in FIGS. 1 to 7, number 1 in FIG. 1 indicates a cable return pulley of a cable transportation system (not shown in the drawings for the sake of simplicity). Return pulley 1 may be either a drive pulley, or an idle pulley rotated by the cable.

Pulley 1 is configured to rotate about an axis of rotation A, and is driven by a drive member 2 (of which only the shaft is shown in the drawings) connected to pulley 1 by a transmission.

More specifically, pulley 1 comprises a hub 3 coupled to drive member 3; and a main body 4 fixed to hub 3.

Main body 4 comprises a substantially circular outer edge 5 having a seat 6 (FIG. 2) configured to house the cable (not shown in the drawings).

Figure 2:
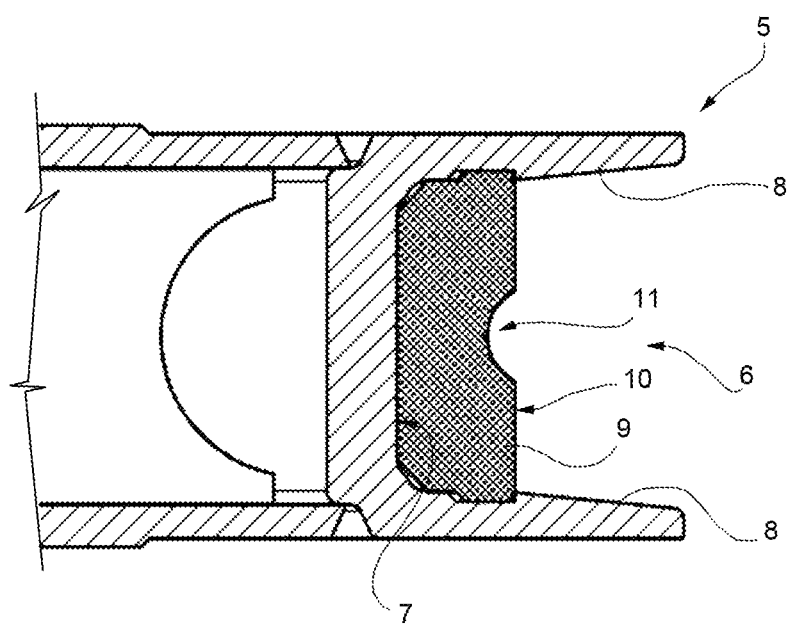
FIG. 2 shows a cross section, with parts removed for clarity, of a detail of the FIG. 1 pulley.

As shown in FIG. 2, seat 6 comprises a bottom wall 7 and two lateral walls 8. Bottom wall 7 is lined with a layer 9 of elastomer material, such as natural rubber. And layer 9 of elastomer material has a face 10 not contacting lateral walls 8 or bottom wall 7.

In certain embodiments, face 10 of layer 9 has a groove 11 configured to house the cable (not shown in the drawings).

Figure 3:
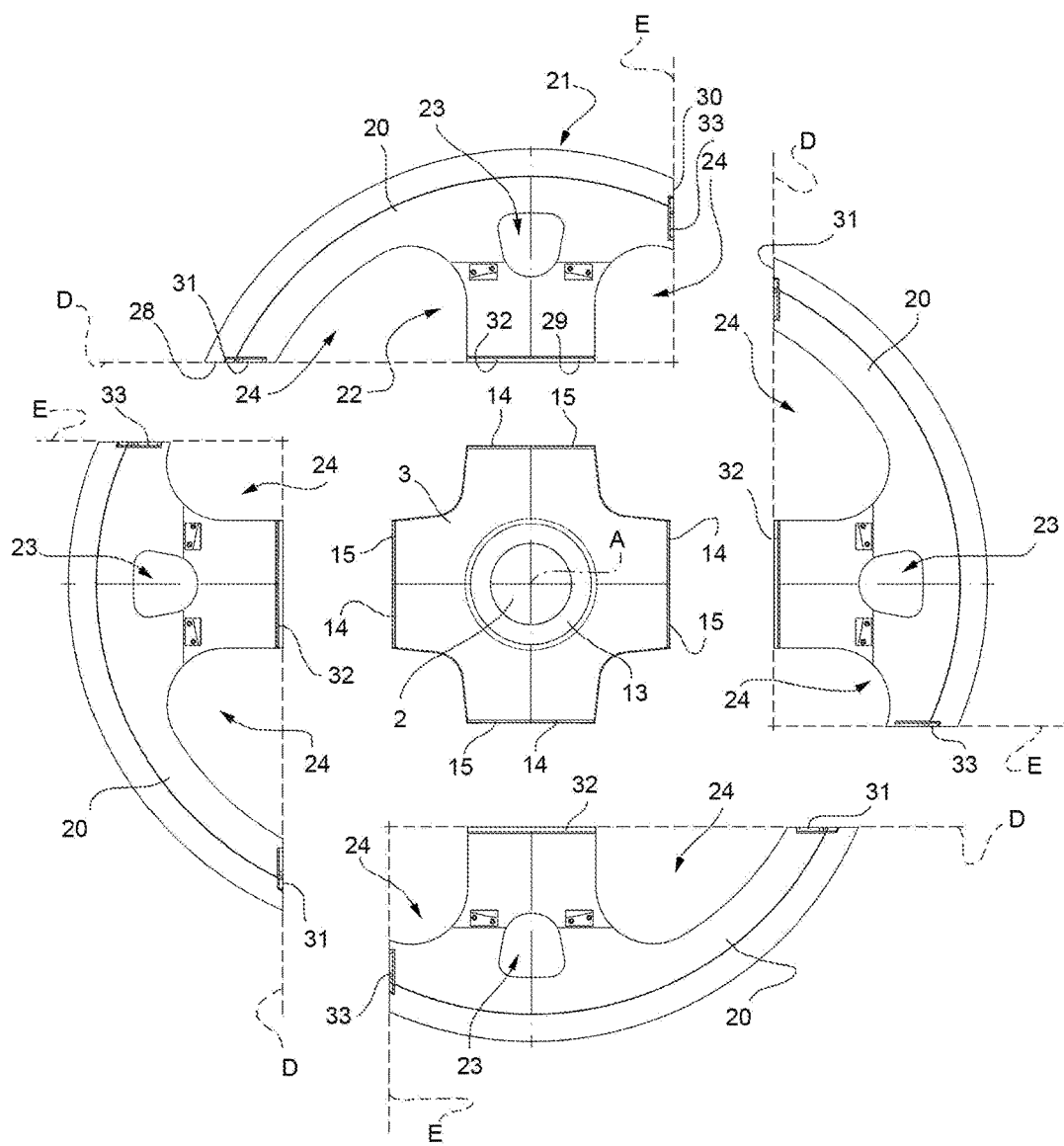
FIG. 3 shows an exploded underside view of the FIG. 1 pulley.

As shown in FIGS. 1 and 3, hub 3 is coupled to the shaft of drive member 2, and is configured to rotate about axis of rotation A.

In certain embodiments, hub 3 is substantially in the form of a square cross, and has four identical lateral coupling sides 14, which are coupled to main body 4 in use.

Lateral coupling sides 14 lie along respective coplanar straight lines a, b, c, d crosswise to axis of rotation A.

In the non-limiting example in FIGS. 1, 2 and 3, straight lines a, b, c, d are perpendicular.

In this example embodiment, each lateral coupling side 14 has a coupling flange 15.

Main body 4 comprises a plurality of sectors 20 coupled to one another.

In the non-limiting example described and shown herein, sectors 20 are four in quantity or number and substantially identical.

Each sector 20 has a curved outer edge 21, in which cable seat 6 is formed; and an inner edge 22.

In this example embodiment, each sector 20 has at least one hole 23; and two recesses 24 located along inner edge 22. Hole 23 and recesses 24 reduce the structural weight of each sector 20, making each sector relatively easier to handle and transport, and relatively cheaper to produce.

As shown in FIG. 1, when sectors 20 are coupled to one another and to hub 3, hub 3 and recesses 24 in sectors 20 form four openings 25 in pulley 1, each located substantially in the centre of a respective quadrant of pulley 1.

In this example embodiment, openings 25 are substantially right-triangle-shaped with rounded vertices.

With particular reference to FIG. 3, inner edge 22 has a first contact portion 28, a second contact portion 29, and a third contact portion 30. In this embodiment, first contact portion 28 and second contact portion 29 are separated by a first recess 24, and second contact portion 29 and third contact portion 30 are separated by a second recess 24.

First contact portion 28 and second contact portion 29 of inner edge 22 are aligned along the same axis D, and third contact portion 30 extends along an axis E.

Axis D and axis E form an angle substantially equal to that formed by the straight lines along which lie the adjacent lateral coupling sides to which sector 20 is to be coupled. In the non-limiting example in FIGS. 1, 2 and 3, the straight lines along which lie the lateral coupling sides of hub 3 being perpendicular, axis D and axis E are also perpendicular.

Each contact portion 28, 29, 30 has a respective coupling flange 31, 32, 33.

In actual use, coupling flange 31 is coupled to coupling flange 33 of the adjacent sector 20; coupling flange 32 is coupled to respective coupling flange 15 of hub 3; and coupling flange 33 is coupled to coupling flange 31 of the adjacent sector 20.

In certain embodiments, coupling flanges 31, 32, 33 and 15 are coupled by bolts (not shown in the drawings).

In a variation not shown, the inner edge has no recesses, so therefore has only two contact portions, which in use extend along the two straight lines along which the respective lateral coupling sides lie.

Figure 4:
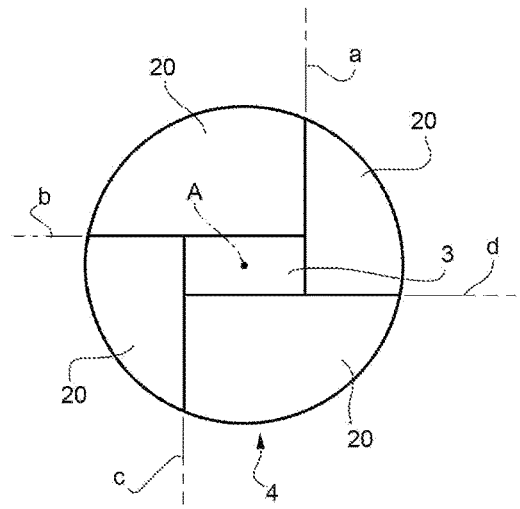
FIG. 4 shows a schematic underside view of a return pulley in accordance with a first variation of the present disclosure.

FIG. 4 shows a cable return pulley 1 in accordance with a second embodiment of the present disclosure, in which hub 3 has a substantially rectangular cross section, and four lateral coupling sides lying along respective coplanar straight lines a, b, c, d crosswise to axis of rotation A; and main body 4 comprises two pairs of identical sectors 20.

Figure 5:
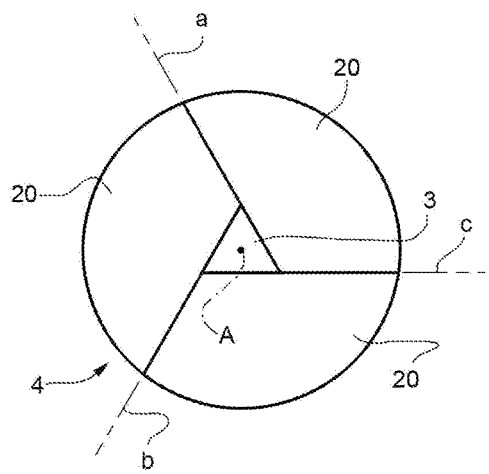
FIG. 5 shows a schematic underside view of a return pulley in accordance with a second variation of the present disclosure.

FIG. 5 shows a cable return pulley 1 in accordance with a third embodiment of the present disclosure, in which hub 3 has a substantially equilateral-triangle-shaped cross section, and three lateral coupling sides lying along respective coplanar straight lines a, b, c crosswise to axis of rotation A; and main body 4 comprises three substantially identical sectors 20.

Figure 6:
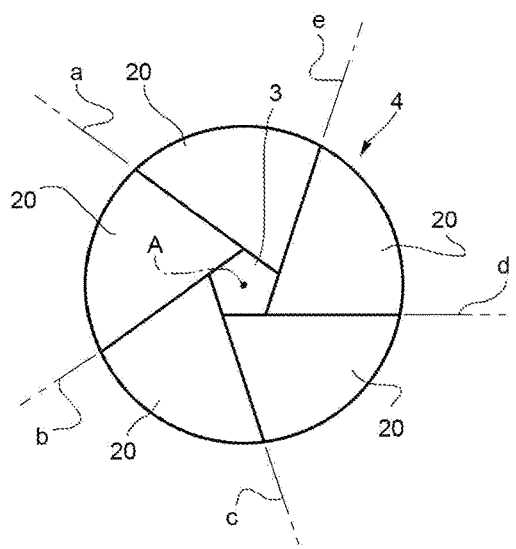
FIG. 6 shows a schematic underside view of a return pulley in accordance with a third variation of the present disclosure.

FIG. 6 shows a cable return pulley 1 in accordance with a fourth embodiment of the present disclosure, in which hub 3 has a substantially regular-pentagon-shaped cross section, and five lateral coupling sides lying along respective coplanar straight lines a, b, c, d, e crosswise to axis of rotation A; and main body 4 comprises five substantially identical sectors 20.

Figure 7:
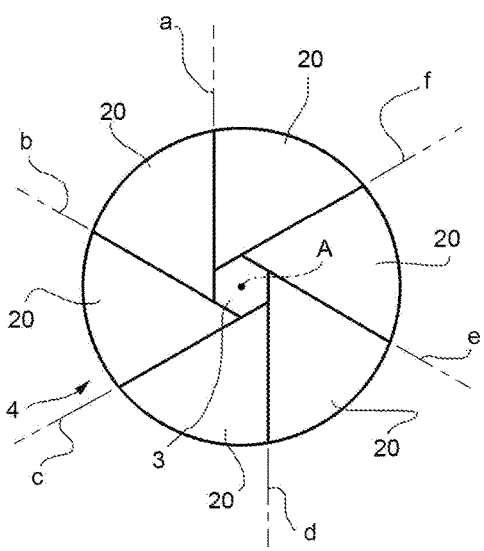
FIG. 7 shows a schematic underside view of a return pulley in accordance with a fourth variation of the present disclosure.

FIG. 7 shows a cable return pulley 1 in accordance with a fifth embodiment of the present disclosure, in which hub 3 has a substantially regular-hexagon-shaped cross section, and six lateral coupling sides lying along respective coplanar straight lines a, b, c, d, e, f crosswise to axis of rotation A; and main body 4 comprises six substantially identical sectors 20.

It is understood that the hub may have a polygonal cross section with any quantity or number of sides. The main body comprises as many sectors as the sides of the hub. When the hub cross section is in the form of an equilateral polygon, the sectors are identical; whereas, in the case of a non-equilateral polygon, the sectors differ in shape and size according to the size and location of the sides of the polygon.

Clearly, changes may be made to the pulley and system as described herein without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A cable transportation system cable return pulley comprising:
   a hub configured to rotate about an axis of rotation, said hub including a quantity of at least three lateral coupling sides, each of said sides lying along a respective straight line, each of said respective straight lines being crosswise to the axis of rotation; and
   a main body coupled to the hub, said main body including:
      an annular seat configured to house a cable, and
      a quantity of sectors equal to the quantity of lateral coupling sides of the hub, wherein each sector is coupled to the hub and to two adjacent sectors along two of said straight lines.

2. The cable transportation system cable return pulley of claim 1, wherein said straight lines are perpendicular.

3. The cable transportation system cable return pulley of claim 1, wherein the main body includes at least two substantially identical sectors.

4. The cable transportation system cable return pulley of claim 1, wherein each of the sectors are substantially identical.

5. The cable transportation system cable return pulley of claim 1, wherein the quantity of sectors is four.

6. The cable transportation system cable return pulley of claim 1, wherein each sector has:
   a curved outer edge in which said annular seat is formed; and
   an inner edge extending substantially along the two of said straight lines.

7. The cable transportation system cable return pulley of claim 6, wherein the inner edge of at least one of the sectors defines at least one recess.

8. The cable transportation system cable return pulley of claim 1, wherein each sector defines at least part of at least one hole.

9. The cable transportation system cable return pulley of claim 1, wherein the annular seat includes a bottom wall lined with a layer of an elastomer material.

10. A cable transportation system comprising:
    two turnaround stations, at least one of the turnaround stations having a return pulley including:
       a hub configured to rotate about an axis of rotation, said hub including a quantity of at least three lateral coupling sides, each of said sides lying along a respective straight line, each of said respective straight lines being crosswise to the axis of rotation, and
       a main body coupled to the hub, said main body including:
          an annular seat configured to house a cable, and
          a quantity of sectors equal to the quantity of lateral coupling sides of the hub, wherein each sector is coupled to the hub and to two adjacent sectors along two of said straight lines; and
    at least one haul cable extending between the two turnaround stations.

11. The cable transportation system of claim 10, wherein said straight lines are perpendicular.

12. The cable transportation system of claim 10, wherein the main body includes at least two substantially identical sectors.

13. The cable transportation system of claim 10, wherein each of the sectors are substantially identical.

14. The cable transportation system of claim 10, wherein the quantity of sectors is four.

15. The cable transportation system of claim 10, wherein each sector has:
   a curved outer edge in which said annular seat is formed; and
   an inner edge extending substantially along the two of said straight lines.

16. The cable transportation system of claim 15, wherein the inner edge of at least one of the sectors defines at least one recess.

17. The cable transportation system of claim 10, wherein each sector defines at least part of at least one hole.

18. The cable transportation system of claim 10, wherein the annular seat includes a bottom wall lined with a layer of an elastomer material.

* * * * *